July 23, 1957
J. R. WEST
2,800,217
HARVESTER INFEED MECHANISM
Filed Sept. 2, 1954
3 Sheets-Sheet 2
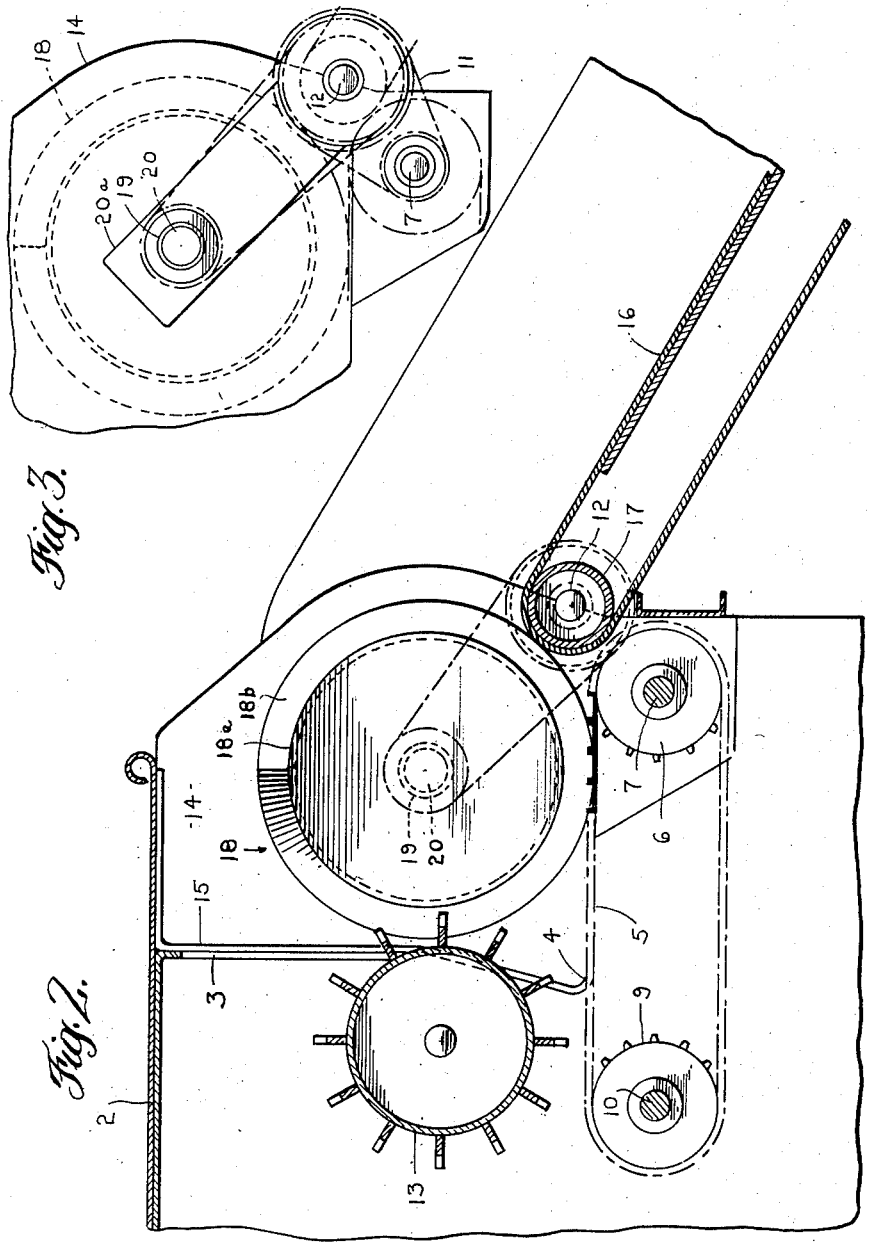
INVENTOR
James R. West
By Richard E. Babcock Jr.
ATTORNEY July 23, 1957
J. R. WEST
2,800,217
HARVESTER INFEED MECHANISM
Filed Sept. 2, 1954
3 Sheets-Sheet 3
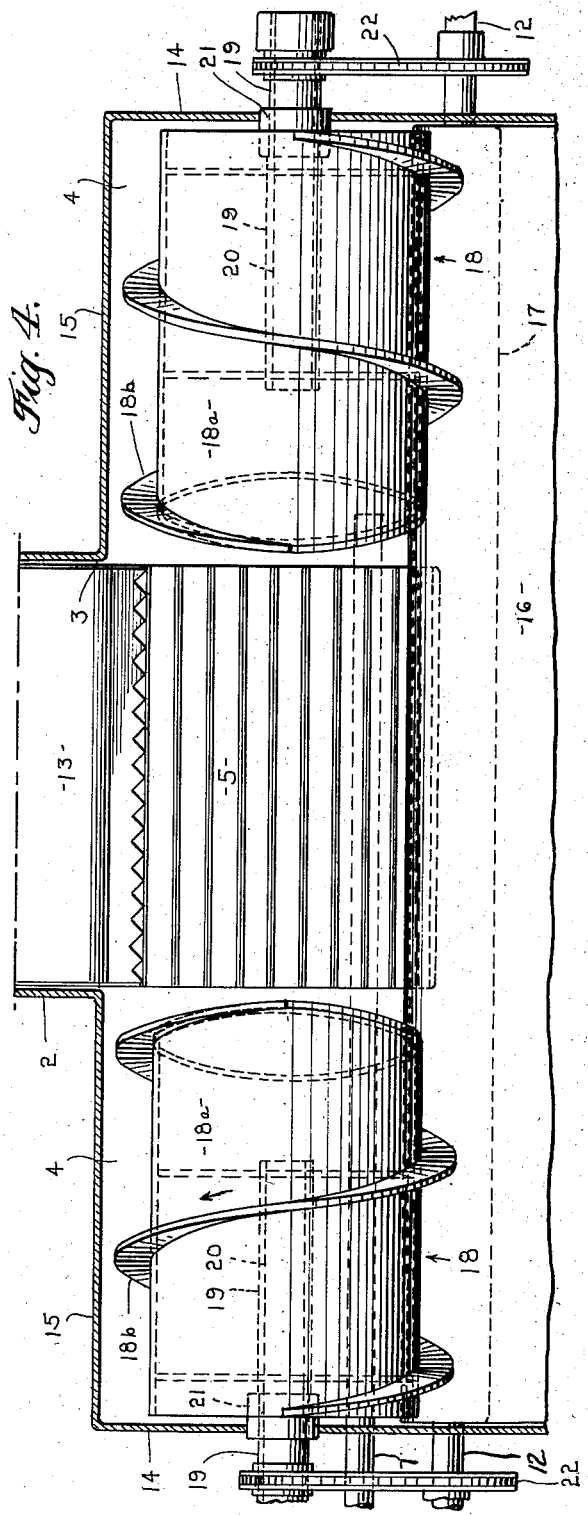
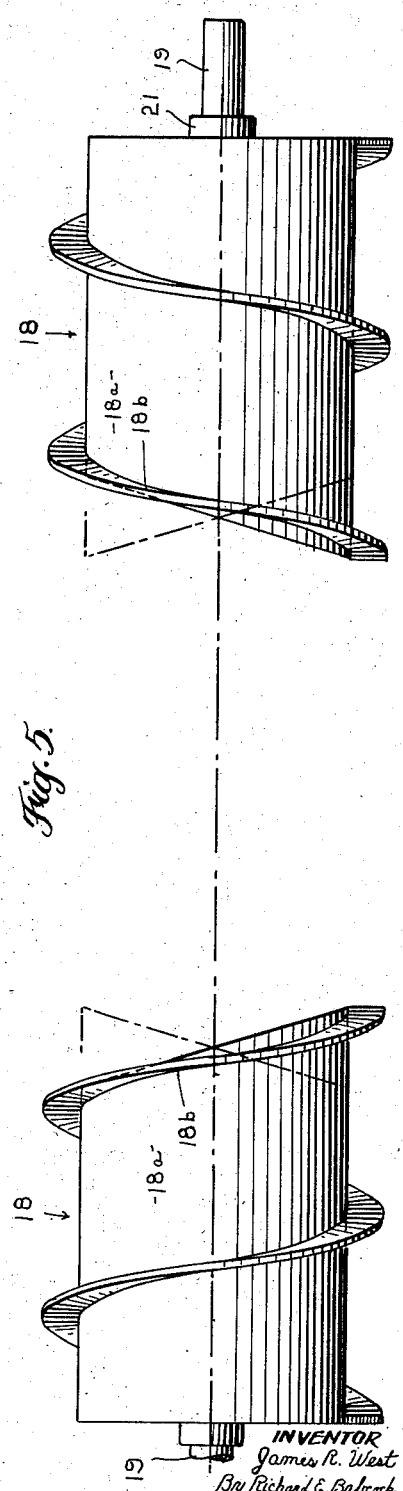

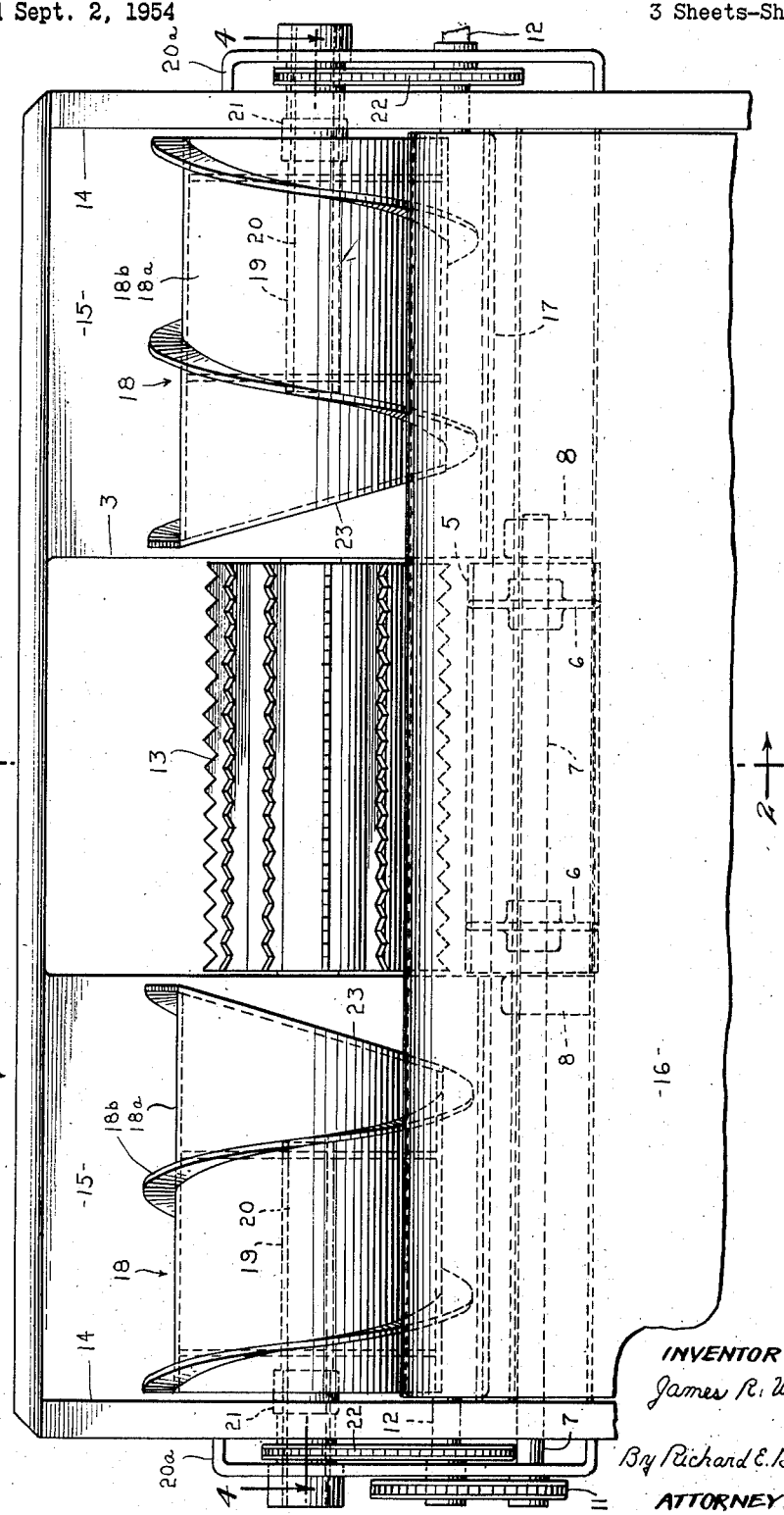

United States Patent Office 2,800,217
Patented July 23, 1957

2,800,217

HARVESTER INFEED MECHANISM

James R. West, New Holland, Pa., assignor, by mesne assignments, to Sperry Rand Corporation, New Holland, Pa., a corporation of Delaware Application September 2, 1954, Serial No. 453,902

14 Claims. (Cl. 198—104)

This invention relates to improvements in a harvester infeed mechanism of the type generally exemplified in the Korsmo et al. Patent 2,470,704 of May 17, 1949, in which a relatively wide main conveyer takes the crop material rearwardly toward a relatively narrow rearwardly moving infeed conveyer, which then feeds it into a relatively narrow feed opening of the harvester infeed housing, laterally opposed auger conveyers at the discharge end of said wide conveyer functioning to laterally condense the incoming material to a width permitting its handling by the narrower conveyer and its reception in the said feed opening.

In such a mechanism it is desirable to avoid having the augers projecting over the infeed conveyer or partially across the feed opening, to thus avoid obstructing the movement of material to and through the feed opening. However, prior to the present invention, such disposition of the augers permitted the infeeding material to laterally bridge across and obstruct the feed opening.

It is, accordingly, the primary object of the invention to obtain the desired positioning of the augers on opposite sides and clear of the infeed opening and conveyer, while minimizing such bridging tendency of the conveyed material across the feed opening.

To this end, the laterally opposed inner ends of the feed augers have end faces in the form of cam plates which are disposed diagonally to their relatively aligned axes of rotation and which converge towards each other normally to said axes, whereby responsive to rotation of the augers in unison these cam plates will periodically converge rearwardly toward and adjacent the feed opening to laterally consolidate the conveyed crop material carried between them on the infeed conveyer just prior to entrance of such material into the feed opening. Any material which may have commenced building up or bridging across the feed opening between such intermittent positioning and functioning of the cam plates will be compressed laterally by the then rearwardly converging plates and thus freed for passage through the feed opening.

It is a further object to locate the augers at a level above the infeed conveyer and to rotate them in unison in such a direction that their lower peripheries move in opposition to the infeed conveyer to cause the bulk of the crop material engaged by said augers to move laterally in front of the augers and thence rearwardly around and between the adjacent auger ends, to be acted upon by said cam plates in the manner above mentioned. Due to such rotation of the augers, it will be further apparent that the adjacent peripheral edges of the converging cam plates in their rearwardly converging relation will move or rotate downwardly toward the infeed conveyer to press the crop material thereagainst and to thereby contribute to the efficiency of the infeed conveyer in drawing the material rearwardly between said converging plates.

Still further incidental objects and advantages will be apparent from the following detailed description considered in conjunction with the accompanying drawings of the preferred embodiment of the invention in which:

Figure 1 represents a front elevational view of the infeed portions of a conventional field forage harvester embodying the preferred form of my invention;

Figure 2, a cross-section on the line 2—2 of Figure 1;

Figure 3, an elevational view of a generallly diagrammatic nature looking toward the right in Figure 1 and illustrating the driving connections between the several rotating parts;

Figure 4, a plan view partly in section on the line 4—4 of Figure 1;

Figure 5, a front elevational view showing the two feed augers rotated 180 degrees from the positions illustrated in Figure 1, these latter positions being illustrated in broken lines in Figure 5.

Referring now in detail to the accompanying drawings, the invention is there illustrated in its preferred application to the pick-up and infeed mechanism of a conventional ground traversing field forage harvester, of which there are illustrated only those portions which are essential to an intelligent understanding of the invention.

Such a forage harvester comprises an infeed housing 2 having a feed opening 3 extended forwardly in the direction of movement of the forage harvester.

Fixed to housing 2 and in advance thereof are feed platforms 4—4 which are laterally spaced apart on opposite sides of the feed opening 3. Disposed for operation between these platforms is a conventional endless infeed conveyer 5, which may be of the type employing flexibly interconnected rigid cross slats supported between sprocket chains in usual manner. Since this construction is purely conventional, it is not illustrated in detail.

In the illustrated embodiment the conveyer 5 is mounted on sprockets 6 fixed on a driven shaft 7 journaled laterally through the brackets 8—8 depending from housing 2, and sprockets 9 fixed on shaft 10 rotatably supported in any suitable manner beneath housing 2. One end of shaft 7 projects laterally inwardly and is connected through a chain drive 11 with a drive shaft 12.

Rotatably supported in housing 2 in spaced relation above the infeed conveyer 5 is a conventional toothed or ribbed upper feed roll 13 which rides over and depresses material carried on the infeed conveyer 5.

The platforms 4—4 are bounded at their laterally outer ends by upstanding side walls 14—14 and at their rear edges by upstanding rear walls 15—15 which extend between the side walls and the housing 2. These walls 14 and 15 serve to confine crop material received on the platform 4.

The main relatively wide endless conveyer 16 of a usual pick-up unit is supported in advance of the feed platforms 4—4 and the infeed conveyer 5. Conveyer 16 is equal in width to the combined width of the platforms 4—4 and conveyer 5 and is disposed to simultaneously deliver crop material in usual manner from a mower or pick-up unit (not shown) onto all of these. For this purpose its delivery end is disposed above and overlaps the said platforms 4—4 and the conveyer 5.

Main conveyer 16 may be supported in usual manner around relatively spaced rolls, of which only the rearmost such roll 17 is illustrated, and is driven through any suitable means connected with the righthand end portion of its shaft 12, which is broken away in Figures 1 and 4. This shaft 12 in the preferred embodiment is identical with the main drive shaft of the mechanism as above described.

For the purpose of feeding the incoming crop material laterally inwardly over the platforms 4 and onto the infeed conveyer 5 to thus laterally consolidate the material received from conveyer 16, there are provided feed augers 18—18. These are supported for rotation over the respective platforms 4—4 on opposite lateral sides of the infeed conveyer 5 and feed opening 3 and in advance of the latter, by relatively aligned lateral sleeves 19—19 coaxially fixed within said augers and rotatably journaled on dead shafts 20—20 carried respectively by brackets 20a—20a and rotatable through bearings 21—21 on the end walls 14.

It will be seen that these augers rotate about the relatively laterally aligned axes of their shafts 20 to feed material laterally inwardly over the platforms onto the infeed conveyer 5, normally to the movement of the conveyor, whereby it merges with the material delivered directly onto conveyer 5 from the main conveyer 16.

The augers are connected for rotation in the same direction in unison, as by the chain drives 22—22 interconnecting their respective sleeves 19 to the main drive shaft 12. By virtue of this arrangement the augers 18 are rotated in the same direction as the conveyor roll 17. Thus, in operation where the said roll is rotated to drive the upper run of the main conveyor 16 rearwardly, both of the augers 18 are rotated in a direction to cause their lower peripheries to move forwardly in opposition to the movement of the material on the conveyers 5 and 16, to thus discourage wrapping of such material about the augers, and to maintain the bulk of such material on the forward side of the augers during its lateral passage inwardly toward the infeed conveyer 5.

Preferably each of the augers 18, comprises a cylindrical tubular body 18a and a helical flight 18b wound therearound in usual manner, the flights of the respective conveyers being oppositely wound so that their rotation in unison will cause delivery of the material in opposite laterally inward directions onto the feed conveyer 5.

Accordingly, the augers will function to laterally consolidate the swath of material delivered by the wide main conveyer 16 to a width wherein it can be conveniently received on and handled by the narrower infeed conveyer 5.

Fixed on the relatively adjacent inner ends of the respective augers 18 are substantially flat cam plates 23—23 which are disposed diagonally to the rotational axes of the augers and which converge toward each other normally to the rotational axes of the augers. Each of the cam plates 23 preferably closes and defines the inner end of its respective tubular auger body 18a and is marginally coextensive with the periphery of said body.

Thus, in operation where the augers are rotated in unison, their said converging cam plates 23 will periodically converge rearwardly toward feed opening 3 to intermittently laterally compress or consolidate the crop material carried between them on the continuously moving infeed conveyer 5, just prior to reception of such material within the feed opening 3. This will obviously prevent or minimize any tendency of the material to bridge across and obstruct the feed opening.

Because of the upward rotational movement of the forwardly presented portions of the augers 18, the bulk of the conveyed material engaged by said augers will be maintained forwardly of the augers during its lateral inward movement onto the infeed conveyer 5, whereby upon being transferred onto conveyer 5 such material will be drawn rearwardly around the adjoining inner ends of the augers and between the cam plates 23. Thus, substantially all of the crop material received from the main conveyer 16 will be required to pass between the cam plates 23 enroute to the feed opening 3 to be laterally consolidated by these plates just prior to reception in the feed opening.

Moreover, due to the direction of rotation of the augers 18, when the cam plates 23 are in their rearwardly converging relation, their rear peripheral edges at the most nearly axially adjacent portions of the augers will thus be rotating downwardly toward infeed conveyer 5 to press the crop material thereagainst and to thereby contribute to the action of the conveyer 5 in drawing the material rearwardly between plates 23.

It is believed obvious therefore that in the above described new combination of elements, the augers and the cam plates carried thereby cooperate in a new, highly ingenuous and unobvious manner with the infeed conveyer 5 and the feed opening 3 to intermittently laterally compress crop material carried into the feed opening 3 on conveyer 5 and thus to prevent bridging or obstructing of the feed opening by such material. Moreover, since the inner ends of the augers terminate on laterally opposite sides of the feed conveyer and feed opening and do not laterally overlap or overlie either of these, it will be readily apparent that these augers do not in any way obstruct or decrease the material handling capacity of the infeed conveyer 5.

In this application there is shown and described only the preferred embodiment of the invention simply by way of illustration of the preferred mode contemplated by me of carrying out the invention as by law required. However, it is recognized that the invention is capable of other and different embodiments. It will be apparent that a single auger of the type previously described could be employed and that several details of the structure may be modified in various ways all without departing from the spirit and scope of the invention. Accordingly, the drawings and description herein are intended to be merely illustrative in nature and not exclusive.

Having thus described my invention, I claim:

1. In a crop infeed mechanism for harvesters comprising a housing having a forwardly directed feed opening, a main conveyer of greater width than said opening extending laterally on opposite sides thereof for delivering material rearwardly toward the opening, said main conveyer terminating rearwardly in spaced relation from the opening, a relatively narrower infeed conveyer moving rearwardly from said main conveyer into the opening for conveying material from the main conveyer into the opening, transverse auger conveyers comprising a pair of augers rotatable together about relatively aligned lateral axes on opposite sides of said infeed conveyer at the delivery end of the main conveyer, for laterally consolidating the material delivered by the main conveyer to substantially the width of the feed opening, said augers comprising tubular bodies and helical flights respectively wound in opposite directions around said bodies, substantially flat cam plates extending across the adjacent ends of the respective bodies diagonally to the rotational axes thereof, said plates being relatively symmetrically inclined on opposite sides of the feed opening and converging transversely to their rotational axes, means rotating the respective augers in unison and causing their diagonal cam plates to periodically converge toward said opening, whereby material carried between such plates by the infeed conveyor will be periodically laterally consolidated for entry into the opening without clogging.

2. The combination of claim 1 wherein the rotation of said augers is such that their lower peripheries move forwardly in opposition to the rearwardly moving crop material to avoid wrapping.

3. The combination defined in claim 1 wherein the rotation of the augers is in such a direction that in said rearwardly converging relation of the cam plates their relatively adjacent portions are rotating toward said infeed conveyer to compress the material thereagainst and to thereby contribute to the action of said infeed conveyer in drawing the material between said plates.

4. A crop infeed mechanism for laterally consolidating conveyed crop material for passage through a relatively narrow opening comprising, a rearwardly moving main conveyer of relatively great width, a rearwardly moving relatively narrower infeed conveyer substantially aligned with and disposed to receive conveyed material from said main conveyer, a pair of auger conveyers at the delivery end of said main conveyer located respectively on opposite sides of the infeed conveyer for rotation about laterally aligned axes to laterally consolidate the conveyed material to substantially the width of the infeed conveyer, the augers of said auger conveyer comprising tubular bodies and helical flights respectively wound in opposite directions of said bodies, substantially flat axially diagonally disposed cam plates extending across the relatively adjacent ends of the respective bodies and intersecting the rotational axes of said bodies, said plates being inclined in relatively converging relation transversely to the auger rotational axes, means rotating said augers in unison whereby their said cam plates will periodically converge rearwardly, the material carried between such plates by the infeed conveyer being thus laterally consolidated for passage through said opening.

5. A crop infeed mechanism for laterally consolidating conveyed crop material for passage through a relatively narrow opening comprising, a rearwardly moving main conveyer of relatively great width, a rearwardly moving relatively narrower infeed conveyer substantially aligned with and disposed to receive conveyed material from said main conveyer, a pair of auger conveyers at the delivery end of said main conveyer located respectively on opposite sides of the infeed conveyer for rotation about laterally aligned axes to laterally consolidate the conveyed material to substantially the width of the infeed conveyer, substantially flat axially diagonally disposed cam plates fixed on the adjacent ends of the respective augers of the auger conveyers, said plates extending diagonally across and intersecting the rotational axes of the conveyers and being in peripherally converging relation, and means rotating said augers in unison whereby their said cam plates will periodically converge rearwardly toward the feed opening, the material carried between such rearwardly converging plates by the feed conveyer being thus laterally consolidated for passage through said opening.

6. In combination with a harvester including a feed housing defining a forward longitudinally directed feed opening, a crop infeed mechanism comprising an endless infeed conveyer moving rearwardly through said opening, a relatively wide main conveyer generally aligned with and delivering material onto said endless conveyer, one lateral edge portion of said main conveyer projecting laterally to one side of said endless conveyer, an auger having a spiral auger flight supported above the level of said endless conveyer in longitudinal alignment with said projecting edge portion for rotation about a lateral axis to receive material from said main conveyer and move it laterally onto the endless conveyer, one axially presented end of said auger being disposed closely adjacent said opening, said end of the auger comprising a generally flat cam plate disposed diagonally to and intersecting the rotational axis of the auger and in some positions of rotation being inclined rearwardly inwardly toward the said opening to further laterally move said material incident to its movement toward the opening on the endless conveyer, said auger flight terminating adjacent and lying wholly on one axial side of said cam plate.

7. In a crop infeed mechanism an auger conveyer comprising a generally cylindrical tube, an auger flight wound helically therearound, and a flat cam plate extending completely across the delivery end of said tube diagonally to and intersecting the cylindrical axis of said tube, said auger flight terminating adjacent and lying wholly on one axial side of said plate.

8. In combination with a harvester including a housing having a forward longitudinally directed feed opening, an infeed conveyer extending forwardly from said opening and urging crop material rearwardly through the opening, augers on opposite lateral sides of said infeed conveyer rotatable about relatively aligned lateral axes to deliver crop material inwardly to said infeed conveyer at right angles to the movement thereof, the delivery ends of said augers lying closely adjacent and on opposite sides of said feed opening, axially diagonally disposed flat cam plates fixed on said ends of the respective augers in symmetrically converging relation to each other, said plates extending diagonally across and intersecting the axes of their respective augers, and means rotating the said augers in unison, whereby their said cam plates will periodically converge rearwardly to laterally consolidate the crop material carried between them on the infeed conveyer just prior to entrance of such material into the feed opening.

9. In combination with a harvester including a housing having a forward longitudinally directed feed opening, an infeed conveyer extending forwardly from said opening and urging crop material rearwardly through the opening, augers on opposite lateral sides of said infeed conveyer rotatable about relatively aligned lateral axes to deliver crop material to the infeed conveyer at right angles to its movement, the delivery ends of said augers lying closely adjacent and on opposite sides of said feed opening, said augers comprising generally cylindrical bodies and helical flights respectively wound in opposite directions thereon, axially diagonally disposed substantially flat cam plates fixed on the relatively adjacent ends of said cylindrical bodies converging toward each other transversely to the rotational axes of the augers, said plates extending diagonally across and intersecting the axes of their respective augers, and means rotating the said augers in unison whereby their said cam plates will periodically converge rearwardly to laterally consolidate the crop material carried between them by said infeed conveyer.

10. The combination of claim 8 wherein said augers are located at a level above said infeed conveyer and the rotation of the augers is such that their lower peripheries move in opposition to said conveyer to cause the bulk of the conveyed crop material to move laterally in front of the augers and thence rearwardly around and between the ends of said augers.

11. The combination of claim 9 in which said augers are located at a level above said infeed conveyer and the rotation of the augers is such that their lower peripheries move in opposition to said conveyer to cause the bulk of the material engaged by the augers to move laterally in front of the augers and thence rearwardly around and between the ends thereof and the cam plates fixed on said augers, the relatively converging rear peripheral edges of said cam plates in the rearwardly converging relation of said plates thus rotating toward the infeed conveyer to press the crop material thereagainst and to thereby contribute to the action of the conveyer in drawing such material between said plates.

12. In combination with a harvester including a housing having a forwardly longitudinally directed feed opening, an infeed conveyer extending forwardly from said opening and urging crop material rearwardly through said opening, an auger on one lateral side of said conveyer rotatable about an axis extending laterally to the conveyer movement to deliver conveyed materials onto said conveyer transversely to its rearward movement, the delivery end of said auger being located to one side and forwardly of said feed opening, and a flat cam plate extending across said delivery end of the auger diagonally to and intersecting the rotational axis of the auger, whereby during rotation of the auger said plate will be periodically positioned to laterally displace material carried by the infeed conveyer toward the said opening.

13. In combination with a harvester including a housing having a forwardly directed longitudinaly directed feed opening, an infeed conveyer extending forwardly from said opening and urging crop material rearwardly through said opening, augers on opposite lateral sides of said infeed conveyer rotatable about relatively aligned lateral axes to deliver crop material to said conveyer at right angles to the movement thereof, the delivery ends of said augers lying closely adjacent and on opposite sides of said feed opening, axially diagonally disposed substantially flat cam plates fixed on said ends of the respective augers in converging relation to each other, said plates extending diagonally across and intersecting the axes of their respective augers, and means interconnecting the said augers for rotation in unison.

14. In combination with a harvester including a housing having a forward longitudinally directed feed opening, an infeed conveyer extending forwardly from said opening and urging crop material rearwardly into said opening, augers on opposite lateral sides of said opening rotatable about relatively laterally aligned axes to deliver crop materials onto said conveyer in position for movement into said opening, axially diagonally disposed cam plates fixed on said ends of the respective augers in converging relation to each other, said plates extending diagonally across and intersecting the axes of their respective augers, and means interconnecting said augers for rotation in unison.

References Cited in the file of this patent
UNITED STATES PATENTS

| | | |
|---|---|---|
| 2,312,785 | Welty | Mar. 2, 1943 |
| 2,470,704 | Korsmo et al. | May 17, 1949 |
| 2,477,970 | Downing et al. | Aug. 2, 1949 |
| 2,599,438 | Downing et al. | June 3, 1952 |